United States Patent
Viviroli

(10) Patent No.: US 10,666,028 B2
(45) Date of Patent: May 26, 2020

(54) METHOD FOR STRIPPING A CABLE

(71) Applicant: Komax Holding AG, Dierikon (CH)

(72) Inventor: Stefan Viviroli, Horw (CH)

(73) Assignee: KOMAX HOLDING AG, Dierikon (CH)

(*) Notice: Subject to any disclaimer, the term of this patent is extended or adjusted under 35 U.S.C. 154(b) by 321 days.

(21) Appl. No.: 15/493,230

(22) Filed: Apr. 21, 2017

(65) Prior Publication Data

US 2017/0310092 A1 Oct. 26, 2017

(51) Int. Cl.
*H02G 1/12* (2006.01)

(52) U.S. Cl.
CPC .................. *H02G 1/1253* (2013.01)

(58) Field of Classification Search
CPC .... H01R 43/048; H01R 48/05; H01R 48/052; H02G 1/12; H02G 1/1202; H02G 1/1253
See application file for complete search history.

(56) References Cited

U.S. PATENT DOCUMENTS

| | | | | |
|---|---|---|---|---|
| 3,309,948 A | * | 3/1967 | Falken | B21F 11/00 81/9.51 |
| 4,091,695 A | * | 5/1978 | Funcik | H02G 1/1256 29/564.4 |
| 4,403,383 A | * | 9/1983 | Dewhurst | H01R 43/28 29/33 M |
| 4,489,476 A | * | 12/1984 | Over | B23P 19/04 29/564.4 |
| 4,713,880 A | * | 12/1987 | Dusel | H01R 43/05 29/564.4 |
| 5,038,457 A | * | 8/1991 | Yasushi | H01R 43/048 29/564.4 |
| 5,343,605 A | * | 9/1994 | Nazerian | H02G 1/1256 29/33 M |
| 5,528,962 A | * | 6/1996 | Hoffa | H02G 1/1256 29/825 |
| 5,582,078 A | * | 12/1996 | Talley | H02G 1/1265 81/9.42 |

(Continued)

FOREIGN PATENT DOCUMENTS

| | | |
|---|---|---|
| EP | 2717399 A1 | 4/2014 |
| EP | 2919340 A1 | 9/2015 |

(Continued)

*Primary Examiner* — Carl J Arbes
(74) *Attorney, Agent, or Firm* — Williams J. Clemens; Shumaker, Loop & Kendrick, LLP

(57) ABSTRACT

A method for stripping and testing of a cable having at least one conductor enclosed in an insulating sheath uses a stripping device with at least one stripping blade. The method steps include: extending the stripping blade in a transverse direction to sever the insulating sheath; displacing the stripping blade in a longitudinal direction to pull off the severed insulating sheath; detecting a contacting of the conductor; retracting of the stripping blade in the transverse direction when the contacting is detected; recording the movement data of the stripping blade at the time of contacting; determining a further movement course of the stripping blade from the movement data and forming a corresponding local quality value is formed; and comparing the local quality value with a quality specification to establish whether a quality of the conductor meets requirements.

17 Claims, 2 Drawing Sheets

(56) References Cited

U.S. PATENT DOCUMENTS 5,630,341 A * 5/1997 Hoffa .................. H02G 1/1256
29/825
5,664,324 A * 9/1997 Hoffa .................. H02G 1/1256
29/33 M

FOREIGN PATENT DOCUMENTS

| JP | 63114088 | * | 5/1988 |
| JP | 63114088 A | * | 5/1988 |
| JP | H02151221 A | | 6/1990 |
| JP | 2008061459 A | | 3/2008 |
| JP | 2011188669 A | | 9/2011 |
| WO | 2014002721 A1 | | 1/2014 |
| WO | 2014/060218 A1 | | 4/2014 |

* cited by examiner

METHOD FOR STRIPPING A CABLE

FIELD

The invention relates to a method and a device for stripping an electrical cable.

BACKGROUND

Electrical cables comprise at least one electrical conductor, e.g. a wire or a strand, as well as an insulating sheath made of plastic, which surrounds and electrically insulates the conductor along its length. In order to connect the cable to other electrical components (e.g. plugs, terminals), part of the insulating sheath is removed at one end of the cable and the conductor is exposed. This procedure of removing the insulating sheath is also referred to as stripping.

The stripping process nowadays usually takes place automatically by means of devices which comprise a stripping blade. Two stripping blades are preferably provided, which are displaceable towards the cable from opposite directions along a straight line, in order to sever the insulating sheath and to pull it off from the conductor with a movement of the stripping blades.

Ideally, the insulating sheath should be completely severed and pulled off in this stripping process without the stripping blades touching the conductor. Since the contacting of the conductor by the stripping blades is used however to signal the severing of the insulating sheath, a brief contact with the conductor in the region in which the stripping is to be carried out is however desired. In practice, therefore, it is important to avoid damage during this brief contact with the conductor.

There is therefore a conflict in the selection of the stripping parameters. If the incision depth is not selected large enough, in order to avoid damage to the conductor, the conductor is not expected to be contacted; if the insulating sheath is not sufficiently cut into, it may happen that the insulating sheath is torn off during the pulling-off in such a way that clean insulation edges do not arise. In addition, it is possible for the insulating sheath to slip away from the stripping blades and not be completely pulled off.

On the other hand, if the incision depth is selected too large, damage to the conductor results, which may possibly prevent the processed cable being used. In addition, stresses on the stripping blades arise.

To avoid this problem, it is proposed in WO2014/060218A1 to detect the contacting of the conductor by a stripping blade by means of a capacitive sensor and to readjust the stripping blade in the case of the presence of contacting. For this purpose, a reference capacitor is charged with a voltage and connected preferably periodically to the capacitance of the stripping blades, which increases if the stripping blade makes contact with the metallic conductor. Depending on whether the stripping blade makes contact or not with the conductor, a change in charge of the reference capacitors and a corresponding change in voltage results, which is compared with a reference value in order to establish whether contact is present or not.

In order to improve the stripping processes further, a method is proposed in EP 2 919 340 A1, by means of which the stripping parameters can be optimized. For this purpose, the incision depth at which the conductor is contacted is determined in an optional first phase. In a second phase, stripping takes place with severing and pulling-off of the insulating sheath. After the severing of the insulating sheath, the stripping blades are moved apart by a predetermined measure, the so-called "wayback", which is selected such that the conductor is no longer contacted during the pulling-off of the severed insulating sheath, but the insulating sheath is securely held. In the second phase, cables are stripped sequentially until no further contacting of the conductor occurs during the severing of the insulating sheath on the one hand and the pulling-off of the insulating sheath on the other hand. In an optional third phase, the cable processed with the optimum stripping parameters is examined visually to check the results of the optimization.

It should be noted, however, that the cable geometry is often not known and is also not constant over the entire cable length. The cable geometry can change inside the same cable bundle from production batch to production batch, so that previously optimized stripping parameters are no longer satisfactory. The known determination of the stripping parameters also requires a plurality of incisions which have to be statistically evaluated, which is time-consuming and leads to rejection of material. The visual inspection of the conductor in phase 3 is again associated with a considerable outlay.

As mentioned, not all contacting of the conductor by the stripping blades is critical. In order to establish which of the stripped cables meets to the quality requirements, a method is proposed in EP 2 717 399 A1 for monitoring the stripping processes. After the severing of the insulating sheath, during the pulling-off process, the length positions of the stripping blade are determined at which it has been determined by means of a detection device that at least one of the stripping blades has touched the conductor. The evaluation of the length positions at which conductor contacts have taken place then permits a classification of the stripped cables.

The mentioned methods permit stripping parameters to be optimized from point to point and a quality analysis and classification of the processed cables to be made from point to point. The described processes for optimizing the operating parameters of the stripping device, however, are still very time-consuming.

It should further be noted that when the described contacting of the conductors takes place, not only are the conductors damaged, but the stripping blades are also stressed and subjected to greater wear.

SUMMARY

The problem underlying the present invention is to improve further the described stripping methods.

In particular, a method is created, with the aid of which the precision in the performance of the stripping of cables can be increased and the stress on the stripping blades and the maintenance outlay on the stripping device can be correspondingly reduced. Non-tolerable damage to the conductor and incomplete severing of the insulating sheath are for the most part to be prevented. Defectively stripped cables, on the other hand, are to be quickly identified.

Optimized stripping parameters should be able to be determined more quickly and at reduced cost. With the method according to the invention, the stripping parameters should also be able to be adapted quickly to changes in the cable properties. A readjustment that may in any case need to be made to the incision depth and the so-called "wayback", i.e. the retraction movement wherein the stripping blades are slightly retracted or opened again after the incision, is to take place automatically and with a high degree of precision. Moving the stripping blades too far apart, which is critical especially in the case of small layer thicknesses of the insulating sheath, is to be avoided. A visual inspection of the stripped cables should not be required. The examination of the cables and the ascertainment of stripped cables which do not meet prescribed quality criteria should be able to be carried out automatically with a greater degree of precision.

The quality of the stripped conductor end pieces should be able to be determined easily and efficiently. The quality criteria that are to be met by a stripped cable should be able to be established as desired by the user.

The method is used for the stripping and testing of a cable which comprises at least one conductor enclosed in an insulating sheath, with a stripping device which comprises a control device and at least one stripping blade. For example, the at least one stripping blade of the stripping device can be extended towards the conductor and retracted in a transverse direction by means of a first drive and can be displaced in a longitudinal direction parallel to the conductor by means of a second drive. The method comprises the following steps. In the first phase, the at least one stripping blade is extended in a transverse direction towards the cable extending in a longitudinal direction, in order to sever the insulating sheath or the cable sheath. Two stripping blades displaceable towards one another in the transverse direction are preferably provided. In the following, therefore, only the preferred embodiment of the stripping device with two stripping blades will be referred to.

In a second phase, the stripping blades are displaced in the longitudinal direction in relation to the cable in order to pull off the severed part of the insulating sheath from the conductor and to expose the latter. This relative movement for pulling off the insulation comprises for example a displacement of the stripping blade or stripping blades with the cable held fixed or a displacement of the cable with the stripping blade or stripping blades held fixed; even mixed forms of the aforementioned movement pattern would in any case be conceivable. At least a first contacting of the conductor by the stripping blades is detected in the first and/or the second phase. After the detection of contacting, the stripping blades are retracted in the transverse direction in order to remove the contacting again.

According to the invention, the movement data of the stripping blades are immediately recorded at the time of the contacting of the conductor. For the contacting of the conductor concerned, a further movement course of the stripping blades in relation to the cable is determined from the available movement data. For example, the analysis of the movement course can be used for quality monitoring, so that defective cables can easily be rejected. The movement data can be used for controlling the movement of the stripping blades or of the cable with a view to a process improvement. It is particularly advantageous if a further movement course of the stripping blades and therefrom a corresponding local quality value is formed from the available movement data, said quality value being compared with a quality specification in order to establish whether the quality of the conductor meets the requirements laid down by the user. Even when two stripping blades are provided, only one notch may result in the conductor. Constellations are however conceivable, wherein two almost identical notches result in the conductor due to the two stripping blades, which correspond to the further or extrapolated movement course of the stripping blades after the contacting of the conductor.

The position of the stripping blades on the one side and on the other side of the path covered in the transverse direction and longitudinal direction and/or the speed and/or the acceleration are preferably recorded as movement data for each contacting. These kinematic magnitudes can be determined by position sensors, speed sensors and acceleration sensors. These kinematic magnitudes can be determined particularly advantageously by monitoring the drives. A distance covered is proportional to the number of revolutions of a shaft of a drive motor. The speed of the stripping blades corresponds for example to the rotational speed of the shaft of the drive motor and acceleration of the stripping blades corresponds for example to the change in the rotational speed of the shaft of the drive motor. The movement data, including the position of the stripping blades, can thus be derived without delay from the drive devices. Furthermore, occurring forces can also be measured and taken into account.

The movement data are preferably recorded and evaluated not only at the start of the contacting, but during the entire time of the contacting, preferably continuously for movements in the transverse direction and/or for movements in the longitudinal direction, in order to draw up contacting profiles or notch profiles.

A notch results when the stripping blade penetrates, said notch running radially towards the central axis of the conductor in the first phase during the severing of the insulating sheath. If contacting takes place in the second phase, the cutting edge of the stripping blade is displaced on the one hand towards the longitudinal axis of the conductor and on the other hand parallel to the longitudinal axis in the longitudinal direction, wherein a corresponding notch profile results.

The course of the notch profiles in the first and second phase is primarily dependent on the movement of the stripping blades at the time of contacting, for which reason the resultant notch profiles can advantageously be determined on the basis of the movement data of the stripping blades.

The notch profiles thus no longer have to be determined visually, e.g. with the aid of a microscope in intricate detailed work, but rather are available in the shortest possible time. The virtual notch profiles available after a few clock cycles of a microprocessor provided in the control device can be used on the one hand to check the end pieces of the conductors and on the other hand to optimize the operating parameters of the drive units.

The movement data recorded in the first phase and/or the second phase at the start of and/or during the contacting make it possible, for example, to determine the penetration depth of the stripping blades into the conductor as a local quality value. The determined penetration depth can be compared with a maximum permissible penetration depth, which is available as a quality specification, in order to establish whether the stripped cable meets the user's requirements.

In the second phase, the penetration length is preferably determined on the basis of the movement data as a local quality value and is preferably compared with the maximum permissible penetration length as a quality specification. The method according to the invention makes it possible to determine arbitrary notch profiles and to compare them with corresponding quality specifications.

Additionally, device parameters of the drive device and/or blade parameters of the stripping blades and/or cable parameters of the cable are preferably taken into account to determine the penetration depth and/or the penetration length or an entire notch profile. The mass of the moved device parts connected to the at least one stripping blade, the properties of the first and/or second drive and preferably switching delays that occur are taken into account as device parameters. If small masses are moved, the drives work with small delays and the acquired switching signals, measurement signals and control signals are available with the small delays, smaller notch profiles result. Correspondingly larger notch profiles otherwise result.

Furthermore, the shape of the stripping blades, the cutting edge whereof has for example a V-shape, a circular-arc shape or a sawtooth shape with a greater or smaller opening angle, is relevant for the notch profile.

The cable geometry, in particular the diameter and strength of the conductor, is also particularly relevant as a cable parameter. The diameter and the strength of the insulating sheath are also preferably taken into account. If cable parameters change, the virtual notch profile is correspondingly adapted. A greater penetration depth is to be expected for conductors with a lower strength.

It is preferable to work with empirical values or characteristic curves when determining the notch profiles, wherein the device parameters, and/or the blade parameters and/or the cable parameters are additionally taken into account. For example, notch profiles for different movement data are recorded. These notch profiles can thus be extracted from the database when corresponding movement data are present. The cable parameters are preferably also used for establishing the quality specifications. If the conductor (e.g. wire or strand) has a greater radius, a greater absolute penetration depth can be tolerated. Preferably, therefore, a relative penetration depth is to be expected that results from the ratio of penetration depth to radius. For example, a penetration depth of <5% is tolerated.

At the start of the stripping process, an incision depth is preferably provisionally established for which it is expected that the insulating sheath is completely severed, but the conductor is not damaged. This value of the incision depth is constantly optimized on the basis of at least one of the detected contacts, the first drive preferably being adjusted in such a way that the speed of the at least one stripping blade, when it is extended in the transverse direction, lies below a fixed limiting value when it reaches the optimized incision depth. This limiting value can for example lie at zero or close to zero. The effect of this, therefore, is that the speed at which the stripping blades are penetrating into the conductor, as the case may be, is already reduced and greater damage to the conductor or corresponding stressing of the stripping blade can be avoided.

The parameters for the retraction of the stripping blades in the transverse direction are preferably selected depending on the determined penetration depth, in such a way that the contacting of the conductor is removed. When the stripping blades are retracted (wayback), the latter should be prevented from being opened to wide and the required contact with the severed insulating sheath prevented from being lost. This is especially important if the layer thickness of the insulating sheath is small. The method according to the invention, on the basis of the determined penetration depth, permits the stripping blades to be opened only so wide that the contact with the conductor is removed and the severed insulating sheath is still held securely held. The excursion of the stripping blades can thus be rapidly adapted to changes in the diameter of the conductor.

In order to improve the stripping process further, provision is preferably made such that, after the retraction of the stripping blades in the transverse direction, the latter are again extended in the transverse direction at a speed that is lower, preferably lower by a multiple, than the speed at which the stripping blades were extended during the severing of the insulating sheath. With this important process step, a continuous adaptation of the position of the stripping blades to the surface of the conductor takes place. The stripping blades follow the course of the surface of the conductor, so that even cables with a conductor surface that has considerable waviness can be stripped reliably.

In a further preferred embodiment, the displacement of the stripping blades in the longitudinal direction in relation to the cable for pulling off the severed insulating sheath is delayed or stopped after the detection of the contacting of the conductor until the contacting is removed. In this way, the penetration length or notch length and therefore the volume of the notch profile on the one hand and the stressing of the stripping blades is reduced considerably, so that their wear during the stripping processes markedly diminishes. The maintenance outlay for the stripping device is correspondingly reduced.

The displacement of the stripping blades in the longitudinal direction for the pulling-off of the severed insulating sheath is preferably accelerated again after removal of the contacting, so that the stripping processes, notwithstanding the careful handling of the stripping blades and the cables, can proceed at high cycle rates.

As a quality specification, a maximum profile is preferably established for a maximum permissible notch which results when the stripping blade penetrates into the conductor. The maximum profile, which preferably comprises the maximum permissible penetration depth and the maximum permissible penetration length, is preferably selected depending on the cable geometry and the strength of the cable material.

The maximum profile is preferably changed as a function of the longitudinal displacement of the stripping blades. For example, the maximum permissible penetration depth and/or the maximum permissible penetration length are weighted with at least one weighting factor depending on the longitudinal displacement. For example, a maximum penetration depth in the region of the severing of the insulating sheath and a maximum penetration depth at the end of the conductor are established and the maximum permissible penetration depths and penetration lengths lying in between are correspondingly selected. For example, a weighting factor is used which changes linearly with the displacement of 1.00 to 0.75.

In a further preferred embodiment, a local quality value is formed in each case from the ascertained movement data for each contacting of the at least one stripping blade with the conductor. An overall quality value is subsequently formed from the local quality values which, as described, are preferably weighted, said overall quality value being compared with the quality specification in order to establish whether the quality of the conductor meets the requirements. It is thus possible to recognize conductors, in the case of which the permissible values of the penetration depth and the penetration length have not been exceeded, but in which there is nonetheless a considerable quality deficiency on account of numerous weaknesses.

DESCRIPTION OF THE DRAWINGS

The device according to the invention is described below by way of example in preferred embodiments with the aid of the drawings. In the figures.

DETAILED DESCRIPTION

Figure 1:
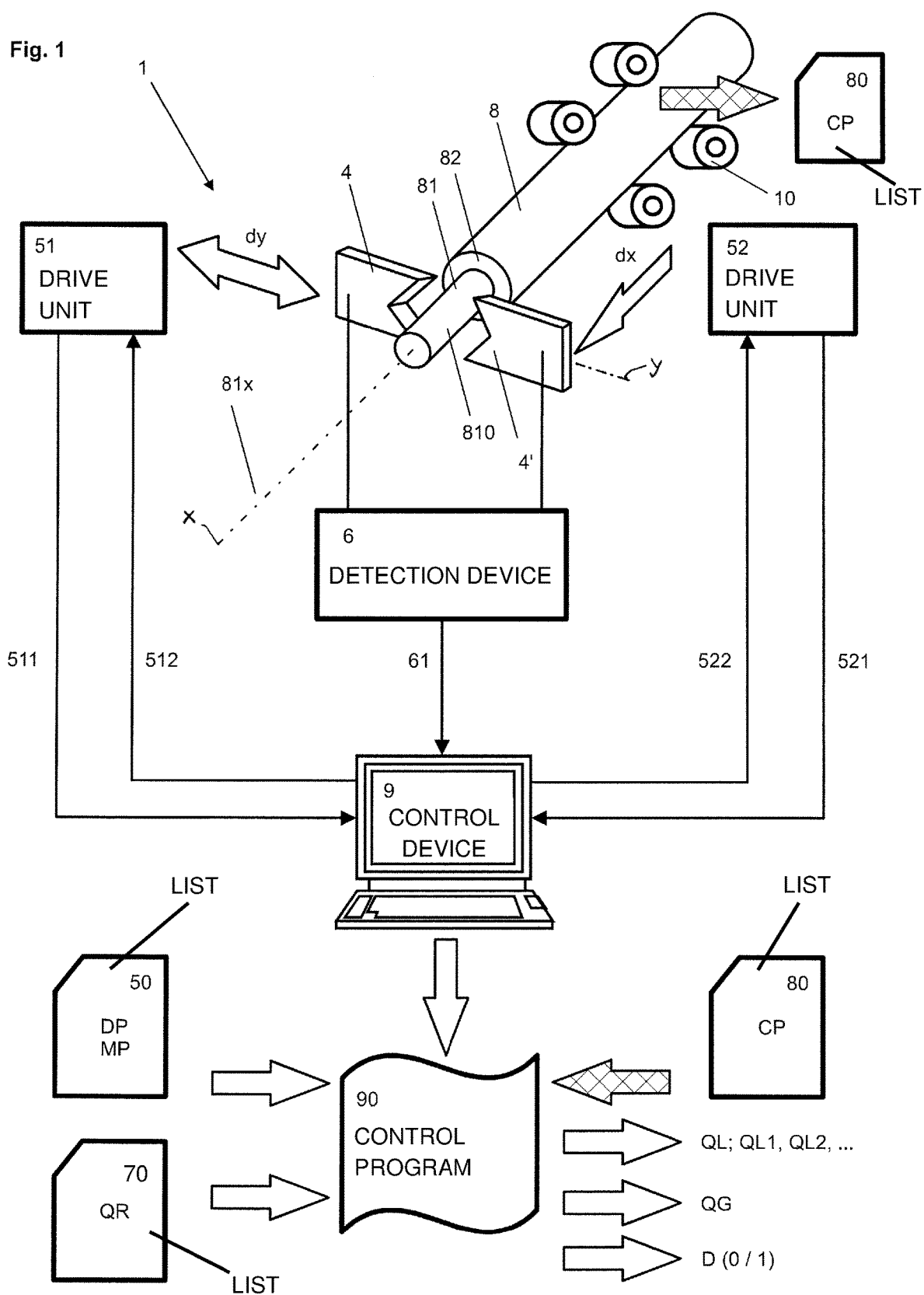
FIG. 1 shows a stripping device 1 according to the invention with two stripping blades 4, 4' driven by a first and a second drive 51, 52, by means of which stripping blades cables 8, which comprise a conductor 81 enclosed in an insulating sheath 82, can be stripped by the method according to the invention.

FIG. 1 shows a stripping device 1 according to the invention in a preferred embodiment, with a holding device 10, which holds a cable 8 fixed or axially displaceable along its longitudinal axis 81x. Stripping device 1 comprises two stripping blades 4 and 4' displaceable along a transverse axis y towards one another and along longitudinal axis x, by means of which stripping blades cable 8 can be stripped, which comprises a conductor 81 surrounded by an insulating sheath 82. As a result of the stripping, an end piece 810 of conductor 81 is exposed, which can be connected in a subsequent operating step to a contact element, e.g. a cable lug.

Two drive units 51, 52 are provided for driving the two stripping blades 4, 4'. Stripping blades 4, 4' can be displaced towards conductor 81 in transverse direction y normal to longitudinal axis x by means of first drive unit 51. Stripping blades 4, 4' can thus be extended towards one another and retracted in order to sever insulating sheath 82 with their V-shaped cutting edges. Stripping blades 4, 4' can be displaced in longitudinal direction x parallel to longitudinal axis 81x of conductor 81 by means of second drive unit 52, in order to pull off a severed part of insulating sheath 82. Instead of displacing stripping blades 4, 4' in the longitudinal direction, as in the present example of embodiment, variants would also be conceivable wherein a displacement of cable 8 is carried out for example by means of holding device 10 with stripping blades 4, 4' held fixed. The method described below, wherein movement data of the stripping blades are recorded and processed, is similarly applicable to a stripping device 1 with stripping blades 4, 4' held fixed for the pulling-off of insulating sheath 82 and longitudinally moved cable 8.

Movement data of stripping blades 4, 4' are made available by the two drive units 51, 52 and converted as required. Insofar as electric motors, e.g. stepping motors, are used in drive units 51, 52, the revolutions of the motor shafts can be detected and converted into the corresponding displacement of stripping blades 4, 4' in transverse direction y or longitudinal direction x. By taking account of the rotational speed and the changes in rotational speed, the speeds and the accelerations of stripping blades 4, 4' during the displacement can also be determined. The movement data of stripping blades 4, 4' are transmitted via sensor lines 511, 521 from drive units 51, 52 to control device 9.

Stripping blades 4, 4' can also be driven by other drive devices, such as pneumatic drives. The movement data of stripping blades 4, 4' can also be supplied by further sensors, such as optical, capacitive and inductive sensors, which are separate from drive units 51, 52.

Stripping device 1 also comprises a detection device 6, by means of which the contacting of conductor 81 by stripping blades 4, 4' is detected. This takes place, for example, by measuring the change in voltage at a reference capacitor, which can be connected to stripping blades 4, 4' and the capacitance whereof is increased when contacting of conductor 81 takes place.

The detection of the contacting of conductor 81 can also take place in another way, e.g. by galvanic transmission of an electrical signal from stripping blades 4, 4' to conductor 81, which is preferably capacitively decoupled from conductor 81 at another point. Cable 8 is used as a so-called leakage line. Detection device 6 is connected via a signal line 61 to control device 9, which via control lines 512, 522 can control first and second drive units 51, 52.

The information arriving from drive units 51, 52 and detection device 6 is processed in control device 9 in an operating program or control program 90, which is designed for performing the method according to the invention.

In the performance of the method according to the invention, control program 90 preferably takes account of other information, such as device parameters DP and measurement parameters MP, which are stored in a list 50; cable parameters CP, which are stored in a list 80; and quality specifications QR, which are stored in a list 70.

By means of control program 90, local quality parameters QL or more precisely QL1, QL2, . . . for each contacting of conductor 81 by stripping blades 4, 4', an overall quality value QG for stripped end piece 810 of conductor 81 and a decision D can subsequently be determined, according to which decision it is established whether stripped cable 8 can be used for the further production processes or has to be eliminated.

The process of stripping conductor 81 comprises the following steps. In a first phase, stripping blades 4, 4' are extended towards one another in transverse direction y in order to sever insulating sheath 82 of cable 8 extending in a longitudinal direction x. In a second phase, stripping blades 4, 4' are displaced in longitudinal direction x in order to pull off severed insulating sheath 82 from conductor 81. In the first phase and/or second phase, all contacts or also only individual contacts can be detected. Following the detection of a contact, stripping blades 4, 4' are retracted again in transverse direction y, preferably at maximum speed, in order to remove the contacting of conductor 81.

The extension and retraction or the forward and return movement of stripping blades 4, 4' in transverse direction y normal to longitudinal axis 81x of conductor 81 is symbolized by a double arrow dy. The displacement of stripping blades 4, 4' in longitudinal direction x is symbolized by an arrow dx.

In order to improve the stripping process, the movement data of stripping blades 4, 4' are recorded at the time of the contacting of conductor 81. On the basis of the available data, the further movement course of stripping blades 4, 4' is subsequently determined, wherein account is taken of the switching procedures by means of which the drive units 51, 52 are switched over. On the basis of all the available data, the movement course of stripping blades 4, 4' inside conductor 81 or a part thereof can be extrapolated. Preferably, the movement data of stripping blades 4, 4' are recorded not only at the beginning, but during the entire duration of the contacting for movements in transverse direction y and/or for movements in longitudinal direction x.

The determination of the movement course or the simulation of the actual movement course can be restricted just to one dimension, preferably extended to two or even three dimensions, so that a spatial profile of the notches in conductor 81 can be determined wholly or in part, without damaged conductor 81 being examined visually. A local quality value QL for this contacting and the resultant notch can thus be determined virtually without delay on the basis of the extrapolated movement course of stripping blades 4, 4' or corresponding data of the determined notch profile.

The evaluation of the ascertained data of the notches can in principle take place in any way.

Determined local quality values QL are preferably compared with a quality specification QR in order to establish whether the quality of conductor 81 meets the requirements.

On the basis of movement data ascertained in the first and second phase during the contacting, penetration depth e (see FIG. 2) of the at least one stripping blade 4, 4' into conductor 81 is preferably determined as a local quality value QL and preferably compared with a maximum permissible penetration depth $e_{MAX}$ as a quality specification QR. Absolute penetration depth e is preferably standardized on the basis of radius r of conductor 81, in order to obtain a more meaningful relative penetration depth e/r, which is compared with a corresponding quality specification QR.

Together with penetration depth e, penetration length l (see FIG. 3), i.e. the length of the notch along longitudinal direction x, is preferably also determined as a local quality value QL and preferably compared with maximum permissible penetration length $l_{MAX}$ as a quality specification QR. Alternatively or in addition, the volume of the notch profile can be determined as a local quality value QL and compared with a maximum permissible penetration volume as a quality specification QR. Quality specifications QR can be established in the same way as they are used in a pure visual examination of conductor 81, wherein cable properties CP are preferably taken into account.

Figure 2:
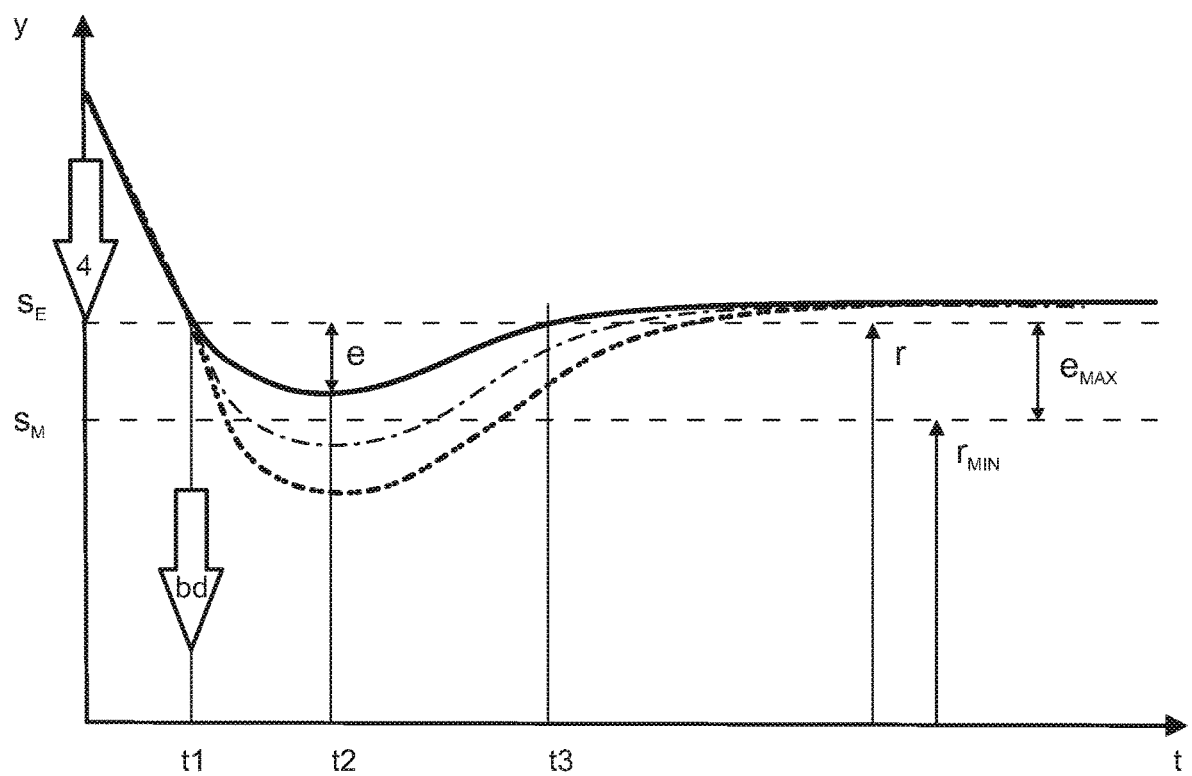
FIG. 2 shows a first diagram with three different movement courses of a stripping blade 4, which has been extended as a function of time along a transverse axis y normal to a conductor 81 and has been retracted again (wayback), in order to sever insulating sheath 82 in a first phase of the stripping process.

FIG. 2 shows a diagram with three different movement courses of a stripping blade 4, which is extended as a function of time along a transverse axis y and retracted again (wayback), in order to sever insulating sheath 82 in a first phase of the stripping process.

The displacement of stripping blade 4 in transverse direction y is plotted on the ordinate and symbolized with an arrow, the tip of which indicates ideal incision depth $s_E$ at which stripping blade 4 severs insulating sheath 82 and has reached the surface of conductor 81. Radius r of conductor 81, maximum permissible penetration depth $e_{MAX}$ and therefore maximum incision depth $s_M$ up to which stripping blade 4 may reach without inadmissibly damaging conductor 81 and falling short of corresponding minimum radius $r_{MIN}$ of conductor 81 are also plotted.

At the start of the stripping process, this ideal incision depth $s_E$ is estimated and correspondingly programmed. When stripping blade 4 is extended, this ideal incision depth $s_E$ is reached at time t1. For various reasons, such as an incorrect evaluation of ideal incision depth $s_E$, on account of manufacturing tolerances and on account of corresponding programming, which makes provision such that stripping blade 4 should contact conductor 81, stripping blade 4 is still in motion at time t1. Corresponding movement data bd are transmitted via lines 511 and 521 to control device 9 and evaluated there in order to determine the further movement course of stripping blade 4 during the time in which stripping blade 4 touches conductor 81. Further data, which are supplied for example by drive units 51, 52 during the contact period, can additionally be taken into account in the determination of the notch profile or parts thereof. The movement parameters at time t1 of the contacting of conductor 81 are however of primary importance.

The first movement course of stripping blade 4, which is represented by a continuous line, shows a penetration depth e, which does not exceed maximum penetration depth $e_{MAX}$. The two further movement lines both exceed maximum penetration depth $e_{MAX}$, for which reason stripped cable 8 is rejected in these cases. The different penetration depths e, which are shifted only slightly in time, arise primarily from the different entry speeds of stripping blade 4 during the contacting of conductor 81.

After detection of the contacting, stripping blade 4 is retracted again (wayback), in order to remove the contact with conductor 81 and to release stripping blade 4 from engagement with conductor 81, which for the first movement course takes place approximately at time t3. On account of the deformation of conductor 81, detection device 6 reports the interruption of contacting with a displacement only along transverse axis y, typically before stripping blade 4 has reached the outer radius of conductor 81. With an additional displacement along longitudinal axis x, the contact typically remains in place, until stripping blade 4 has reached the outer radius of conductor 81. The displacement of stripping blade 4 during the time in which stripping blade 4 contacts conductor 81 therefore corresponds at least approximately to penetration length l.

On the basis of determined penetration depth e, the wayback or the measure of the retraction of stripping blade 4 can then advantageously be established. For example, the stripping blade is retracted by the measure of penetration depth e multiplied by a correction factor k (wayback=e*k), wherein correction factor k is preferably selected in the range from 1.1 to 1.5. The method according to the invention thus permits a rapid adaptation of the excursion of stripping blade 4 to the radius of conductor 81, which is often not constant over the entire cable length.

On the basis of the data ascertained during the contacts, the previously established value for ideal incision depth $s_E$ is preferably constantly optimized. First drive 51 is then adjusted in such a way that the speed of the at least one stripping blade 4, 4' when it is extended in transverse direction y lies below an established limiting value upon reaching optimized incision depth $s_E$. Since the contacting of conductor 81 is certainly desired so that complete severing of insulating sheath 82 can be established, the final speed is however selected greater than zero. Depending on the area of application, however, it may also be advantageous to optimize the stripping process such that contacting of the conductor is just avoided.

Figure 3:
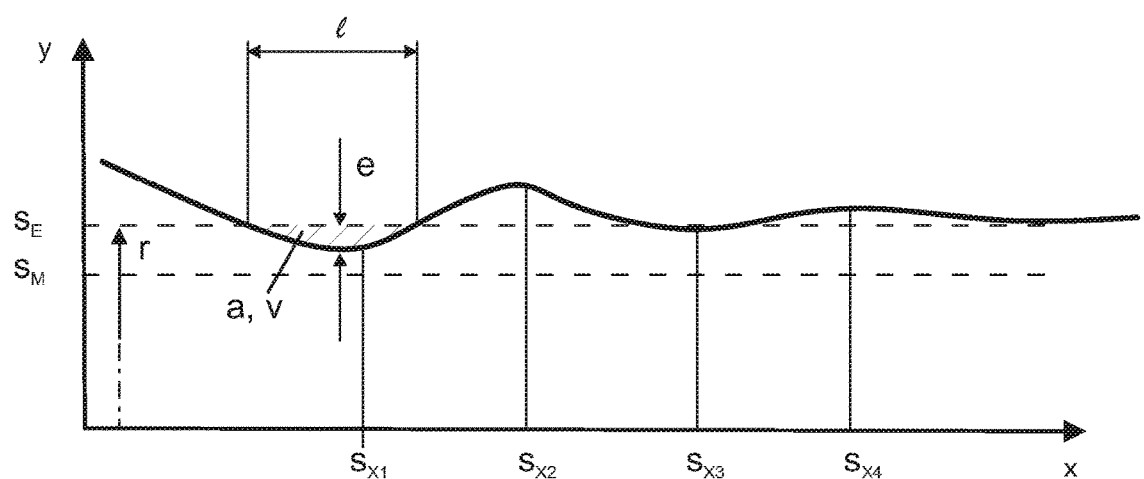
FIG. 3 shows a second diagram with a movement course of stripping blade 4 in a second phase, in which the severed part of insulating sheath 82 has been pulled off along a longitudinal axis x.

FIG. 3 shows a diagram with a movement course of stripping blade 4 in a second phase, in which the severed part of insulating sheath 82 is pulled along a longitudinal axis x. The movement course shows that the adaptation of the excursion of stripping blade 4 to radius r of conductor 81 is pursued continuously during the entire second phase. The respective incision depths with the excursions represented by way of example in FIG. 3 are denoted by $s_{x1}$, $s_{x2}$, $s_{x3}$ and $s_{x4}$. After the rapid retraction of stripping blades 4, 4' in transverse direction y, the latter are again extended in transverse direction y at a speed which is less, preferably less by a multiple, than the speed at which the at least one stripping blade 4, 4' was extended during the severing of insulating sheath 82. Stripping blade 4 thus behaves like a measurement head, which scans the surface of conductor 81. It is possible that stripping blade 4 again enters locally into conductor 81 and causes notches, for which movement data are in turn recorded to determine the notch profile or parts thereof. FIG. 3 shows that penetration depth e, penetration length l and the cross-sectional area or notch profile a or volume v of the notch are determined.

The described adaptation is preferably continued until the stripping process is completed. Since stripping blades 4 are extended with reduced speed in the second phase, inadmissible damage to conductor 81 is scarcely to be expected. Nonetheless, the ascertained data of the notch are preferably also compared in the second phase with prescribed quality specifications QR.

In order to reduce the notch profile, in particular penetration length l, the displacement of stripping blades 4, 4' in longitudinal direction x when pulling off severed insulating sheath 82 is preferably delayed or stopped after the detection of contacting of conductor 81, until the contacting is removed again by the wayback. The deformation of conductor 81 can thus be reduced to short notches. As soon as the contacting is removed, the displacement of stripping blades 4, 4' in longitudinal direction x for pulling off severed insulating sheath 82 is preferably accelerated again up to a predetermined maximum speed.

Maximum permissible penetration depth $e_{MAX}$ or maximum permissible penetration length $l_{MAX}$ or also a maximum profile $p_{MAX}$ for a maximum permissible notch, which should not be exceeded during penetration of stripping blades 4, 4' into conductor 81, can be established as a quality specification QR. These magnitudes are preferably established depending on the cable properties, in particular the cable geometry and the cable materials used.

Damaging of conductor 81 in the region of the severing of insulating sheath 82 in the first phase is normally more critical than damage that occurs in the second phase during the displacement of stripping blades 4, 4' in the longitudinal direction. The values of quality specification QR are preferably changed therefore as a function of longitudinal displacement x. For example, maximum permissible penetration depth $e_{MAX}$ and/or maximum permissible penetration length $l_{MAX}$ is weighted as a function of longitudinal displacement x with a weighting factor which for example changes linearly.

In order to check the overall state of cable 8, a local quality value QL1, QL2, . . . , QLn is preferably formed in each case from the ascertained movement data for each contact of stripping blades 4, 4' with conductor 81. From local quality values QL1, QL2, . . . , QLn, an overall quality value QG is then formed, which is compared with a corresponding value of quality specification QR in order to establish whether the quality of conductor 81 meets the requirements.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A method for stripping and testing a cable, which cable has at least one conductor enclosed in an insulating sheath, with a stripping device including a control device for controlling movement of at least one stripping blade, comprising the steps of:
    a) in a first phase, extending the at least one stripping blade in a direction transverse to a longitudinal axis of the cable for severing a portion of the insulating sheath of the cable;
    b) in a second phase, displacing the at least one stripping blade along the longitudinal axis parallel to the at least one conductor for pulling off the severed portion of the insulating sheath;
    c) detecting a contacting of the at least one conductor by the at least one stripping blade in one of the first phase and the second phase;
    d) retracting the at least one stripping blade in the transverse direction when the contacting is detected to remove the contacting;
    e) recording movement data of the at least one stripping blade at a time of the contacting of the at least one conductor; and
    f) determining a further movement course of the at least one stripping blade from the recorded movement data for controlling subsequent movement of the at least one stripping blade.

2. The method according to claim 1 wherein the movement data are recorded during a duration of the contacting for movements of the at least one stripping blade in at least one of the transverse direction and the direction of the longitudinal axis.

3. The method according to claim 1 including forming a local quality value based upon the movement data, and comparing the local quality value with a predetermined quality specification to establish whether a quality of the at least one conductor meets requirements of the predetermined quality specification.

4. The method according to claim 3 wherein during at least one of the first phase and the second phase a penetration depth of the at least one stripping blade into the at least one conductor is determined as the local quality value, and the local quality value is compared with a maximum permissible penetration depth as the predetermined quality specification.

5. The method according to claim 4 wherein at least one of device parameters of a drive unit for the at least one stripping blade, blade parameters of the at least one stripping blade and cable parameters of the cable are additionally taken into account for determining the penetration depth.

6. The method according to claim 3 wherein in the second phase a penetration length is determined as the local quality value, and the local quality value is compared with a maximum permissible penetration length as the predetermined quality specification.

7. The method according to claim 6 wherein at least one of device parameters of a drive unit for the at least one stripping blade, blade parameters of the at least one stripping blade and cable parameters of the cable are additionally taken into account for determining the penetration length.

8. The method according to claim 3 wherein the local quality value is based additionally upon at least one of:
    device parameters including a mass of moved parts connected to the at least one stripping blade, properties of a drive unit connected to the at least stripping blade, and switching delays of the drive unit;
    a shape of the at least one stripping blade as a blade parameter; and
    cable parameters based upon cable geometry including a diameter of the at least one conductor, a strength of the at least one conductor (81) and a strength of the insulating sheath.

9. The method according to claim 1 including optimizing a previously established value of an incision depth into the cable based upon at least one of the detected contact and adjusting a drive to control a speed of the at least one stripping blade when extended in the transverse direction to be below a fixed limiting value when the at least one stripping blade reaches the optimized value of the incision depth.

10. The method according to claim 1 including selecting parameters for the retracting of the at least one stripping blade in the transverse direction depending on a determined penetration depth to remove the contacting of the at least one conductor.

11. The method according to claim 1 including, after the retraction of the at least one stripping blade in the transverse direction, extending the at least one stripping blade again in the transverse direction at a speed lower than a speed at which the at least one stripping blade was extended during the severing of the insulating sheath.

12. The method according to claim 1 including delaying or stopping the displacement of the at least one stripping blade along the longitudinal axis for pulling off the severed portion of the insulating sheath after the detection of the contacting of the conductor until the contacting is removed.

13. The method according to claim 1 including accelerating the displacement of the at least one stripping blade along the longitudinal axis for pulling off the severed portion of the insulating sheath after the contacting is removed.

14. The method according to claim 1 wherein the recorded movement data of the at least one stripping blade includes at least one of a position relative to the at least one conductor, a path in the transverse direction and along the longitudinal axis, a speed and an acceleration.

15. The method according to claim 1 including establishing a maximum profile for a maximum permissible notch which results when the at least one stripping blade penetrates into the at least one conductor as a quality specification, wherein the maximum profile at least one of a maximum permissible penetration depth and a maximum permissible penetration length.

16. The method according to claim 15 including changing the maximum profile, or parts thereof, as a function of a longitudinal displacement of the at least one stripping blade, wherein at least one of the maximum permissible penetration depth and the maximum permissible penetration length is weighted with at least one weighting factor depending on the longitudinal displacement.

17. The method according to claim 1 including forming a local quality value from the recorded movement data for each of a plurality of contacting of the at least one stripping blade with the at least one conductor, forming an overall quality value from the local quality values, and comparing the overall quality value with a predetermined quality specification to establish whether a quality of the at least one conductor meets requirements of the predetermined quality specification.

\* \* \* \* \*